April 3, 1934.  H. L. SMITH ET AL  1,953,637
CHUCK
Filed April 20, 1932
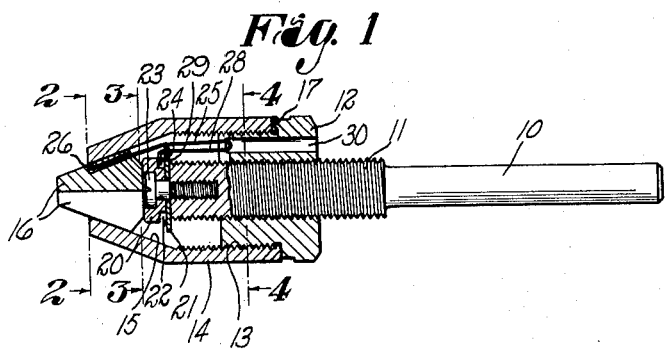
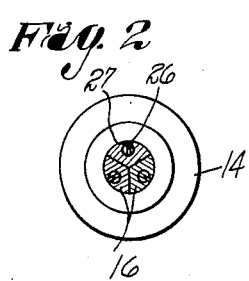 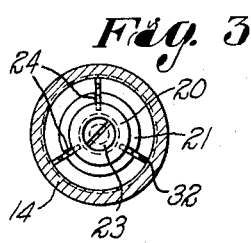 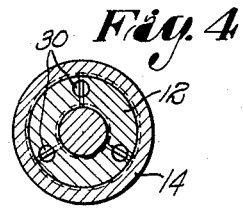
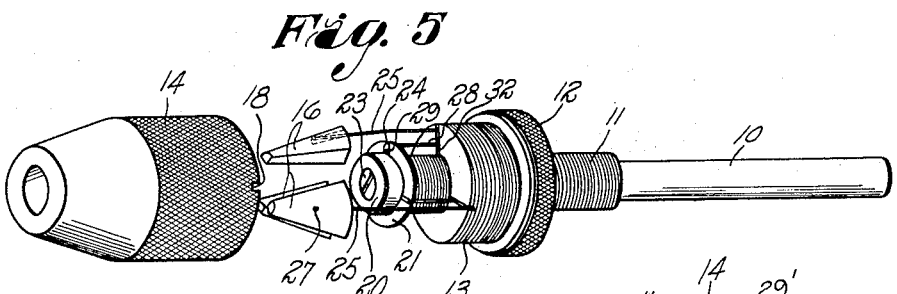
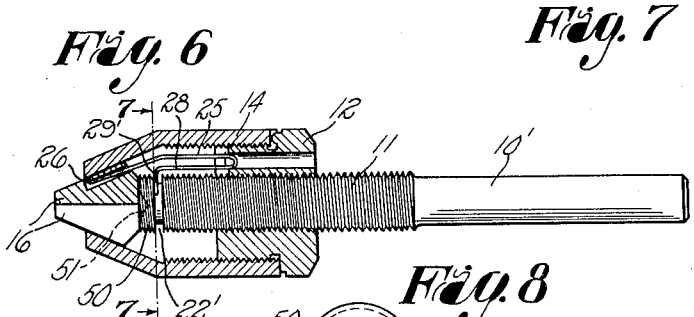
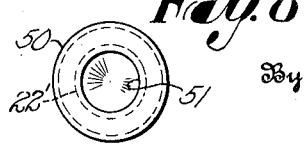
Inventor
Hinman L. Smith
Austin L. Stowell
By
Attorney Patented Apr. 3, 1934

1,953,637

UNITED STATES PATENT OFFICE 1,953,637

CHUCK

Hinman L. Smith, Plainville, and Austin L. Stowell, New Britain, Conn., assignors to The Stanley Works, New Britain, Conn., a corporation of Connecticut Application April 20, 1932, Serial No. 606,320

9 Claims. (Cl. 279—56)

This invention relates to chucks and, particularly, to chucks for use in connection with braces and bit stocks.

The aim of the invention is to provide an improved and simplified chuck construction which is very effective in operation and the parts of which may be more economically made and readily assembled, the construction being such that the springs for urging the jaws apart are protected against injury, and these springs are so arranged as to effectively perform their several functions.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein are shown two embodiments which the present invention may take:

Fig. 1 is a longitudinal sectional view taken centrally through the chuck;

Fig. 2 is a transverse sectional view taken on line 2—2 of Fig. 1;

Fig. 3 is a like view taken on line 3—3 of Fig. 1;

Fig. 4 is a transverse sectional view taken on line 4—4 of Fig. 1; and

Fig. 5 is a perspective view of the complete assembly with the shell detached;

Fig. 6 is a view similar to Fig. 1 but showing another embodiment of the invention;

Fig. 7 is a sectional view taken on line 7—7 of Fig. 6; and

Fig. 8 is an enlarged front end view of the spindle shown in Fig. 7.

Referring to the embodiment shown in Figs. 1 to 5 inclusive, 10 designates a spindle or stem having a threaded portion 11 onto which is screwed a nut or head 12 threaded, as at 13, so as to receive the usual sleeve or shell 14. The forward end of this shell is of conical shape so as to provide a tapering, internal surface 15 which is adapted to bear against the external surfaces of the jaws 16 of suitable number, in the present instance three such jaws being illustrated. The outer surfaces of these jaws are tapered correspondingly to the internal surface 15 of the shell as is usually the case. The sleeve may be secured against turning movement relative to the nut by punching a portion 17 of the nut into a small notch 18 in the rear edge of the sleeve.

Journalled for turning movement on the forward end of the stem or spindle 10 is a follower which, in the present embodiment, consists of two parts, namely, a thrust washer 20 and a disk 21 which are constructed to form a circumferential groove or channel 22. The thrust washer and the disk, interposed between that thrust washer and the forward end of the stem, are held in place by a shouldered screw 23. The rear ends of the jaws 16 are adapted to be engaged by the front face of the thrust washer. The disk 21 has, in its periphery, notches 24 corresponding in number to the number of jaws, in the present instance three.

Associated with the jaws are respective independent springs which serve to urge the jaws apart and to hold the jaws in operative relation with respect to the thrust washer 20. In the present instance, each of these springs is in the form of an elongated U formed by bending a thin round piece of wire back upon itself. One leg 25 of the spring is relatively long and has an out-turned end 26 engaging in a hole 27 of the respective jaw. The other and inner leg 28 of the spring is relatively shorter and has a turned over end 29 projecting into the circumferential groove 22. This shorter leg 28, adjacent its free end, engages in one of the notches 24 of the disk 21. The rear or U portion of each spring has sliding movement in a respective guide opening provided in the nut 12, each guide opening being so constructed as to prevent the spring from turning about its own axis. In the present instance, the nut is shown as having three holes 30 extending forwardly from the rear end of the nut and terminating short of the forward end thereof so as to leave a thin wall at the forward end of each hole. Radially extending narrow slots 32 are milled through these thin walls across the forward end of the openings. The width of these slots is substantially equal to the diameter of the wire of which the springs are formed.

To assemble the parts, the nut 12 is threaded onto the stem, the thrust washer and disk 21 are secured in place by the shouldered screw. Then the springs are positioned with their closed ends extending through the slots 32 and their turned-over ends 29 engaging in the groove 22. The jaws may then be positioned on the free ends of the long legs of the springs. The sleeeve is then screwed onto the nut and secured in place thereon.

When it is desired to apply the chuck to a piece to be held, the sleeve and nut are rotated in a direction to advance them on the stem, thus permitting the springs to urge the jaws apart. When the nut is advanced forwardly, the closed ends of springs are accommodated by the holes 30. Then to cause the jaws to grip the piece, the nut is turned in the opposite direction, with the result that the conical end of the shell or sleeve will cam the jaws towards each other. During this operation, the rear ends of the jaws engage the thrust washer 20. It is, of course, understood that the shell, the jaws, the springs, the thrust washer and the disk rotate as a unit relative to the stem 10 during the operations of opening and closing the chuck. It will also be observed that, due to the engagement of the inturned ends 29 of the springs in the groove 22 of the follower and the engagement of the outturned ends 26 of the springs in the holes 27 of the jaws, there is little relative longitudinal movement between these several elements. Thus, when the sleeve is advanced relatively to the jaws, the jaws are positively drawn back and they cannot stick in the conical end of the shell.

Referring now to the embodiment shown in Figs. 6 to 8 inclusive, the shell 14, the nut 12, and the jaws 16 may be similar to the corresponding parts of the preceding embodiment. In this case, the groove 22' is formed in the spindle 10' adjacent the forward end thereof. The spindle, forwardly of this groove, has an end or head portion 50 which may be of the same diameter as, and threaded correspondingly to, the portion 11. The forward end of the spindle is adapted to engage the rear ends of the jaws, and this end may have a conical recess or seat 51 which is adapted to accommodate the tapered end of a drill or the like. The advantage of this recess is that it aids in centering the drill or other tool gripped by the jaws.

In this latter embodiment, the springs are generally similar to the springs of the preceding embodiment and, therefore, bear similar reference characters. In this instance, however, the forward ends of the inner or shorter legs 28 are provided with transversely extending T-heads 29', the cross portions 52 of which are curved so that they have a good bearing against the bottom of the annular groove 22'. The T-head on each wire is formed by bending the extreme end of the wire back upon itself and then making a reverse bend inwardly of the first one. A chuck made in accordance with these arrangements works very satisfactorily and presents a structure which is very simple and which can be economically manufactured. It will be observed that, after the parts are assembled, the spring locks the nut against accidental removal from the spindle; that is to say, the nut cannot ride up on the spindle beyond the point where the heads of the springs enter the annular groove. This is an important point, especially on hand drills used in training schools where loss of parts and mix-ups results from tools which come apart too readily.

It will further be seen that, in each embodiment illustrated, the nut is formed to accommodate the closed ends of the springs and, therefore, these springs may be made of sufficient length to properly perform their functions without danger of being injured while, at the same time, the over-all length of the chuck may be reduced. Also, by employing this arrangement, the number of parts is reduced to a minimum, the springs are effectively and simply held in place, and assembly of the parts is facilitated.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a chuck, a threaded spindle, a nut threaded thereon, a shell carried by said nut and having a tapered forward end, jaws adapted to cooperate with said tapered end, a follower on the forward end of said spindle and adapted to engage the rear ends of said jaws, and a plurality of U-shaped springs respectively associated with said jaws, said nut having a number of holes extending from its rear end to a point adjacent its forward end, said nut having at its forward end slots extending radially across the forward ends of said holes, the rear ends of said springs extending through said slots and into said holes.

2. In a chuck, a threaded spindle, a nut screwed on said spindle, a shell on said nut and having a tapered end, a plurality of jaws in said shell adapted to be moved inwardly thereby, a circumferential groove adjacent the forward end of said spindle, and springs tending to force said jaws outwardly, said nut having openings in which the rear ends of said springs are slidably mounted, and said springs having portions engaging in said groove.

3. In a chuck, a spindle having a thread, a nut screwed on said thread, a shell secured to said nut and having its forward end inwardly tapered, jaws within the tapered end of said shell, means on the forward end of said spindle for engaging the rear ends of said jaws, a groove adjacent the forward end of said spindle, a plurality of springs respectively associated with said jaws, each of said springs comprising a U-shaped member having a leg to the free end of which a respective jaw is connected, the other leg of each spring having at its free end a portion engaging in said groove, said nut having longitudinally extending openings respectively accommodating the rear closed ends of said springs.

4. In a chuck, a spindle part having an external thread, a nut screwed on said spindle part, a shell carried by said nut, a plurality of jaws adapted to be moved towards each other by said shell when said nut is moved rearwardly of the spindle, a follower part rotatably mounted on the forward end of said spindle part and adapted to engage behind said jaws, and a plurality of springs respectively associated with said jaws, each of said springs comprising a U-shaped member, one leg of which is connected to a respective jaw, the other leg of each spring being operatively connected to one of said parts to prevent longitudinal movement of the spring relative to each of said parts, said nut having openings into which the rear closed ends of said spring extend.

5. In a chuck, a spindle part having a thread, a nut screwed onto said thread, a follower part rotatably mounted on the forward end of said spindle part, one of said parts having a circumferential groove, a shell secured to said nut and having its forward end internally tapered, jaws within the tapered end of said shell and having their rear ends engaging said follower part, and a plurality of springs respectively associated with said jaws, each of said springs comprising a U-shaped member having a long leg to the free end of which a respective jaw is connected, the other leg of each spring having at its free end a portion engaging in said groove, said nut having longitudinally extending openings respectively accommodating the rear closed ends of said springs.

6. In a chuck, a spindle having a thread, a nut screwed onto said thread, a shell carried by said nut and having its forward end internally tapered, a follower journalled on the forward end of said spindle and having a circumferential groove, a plurality of jaws within the tapered portion of said shell and having their rear ends engaging said follower, and a plurality of springs respectively associated with said jaws, each of said springs comprising a U-shaped member provided with a pair of legs, one of said legs being connected to a respective jaw, the other of said legs having a part engaging in said groove, said nut having openings respectively accommodating the rear ends of said springs.

7. In a chuck, a spindle having a threaded portion, a nut screwed onto said threaded portion, a shell carried by said nut and having an internally tapered forward end, a plurality of jaws in the tapered end of said shell, a follower rotatably mounted on the forward end of said spindle and adapted to engage the rear ends of said jaws, said follower having a circumferential groove and a flange rearwardly of said groove and provided with peripheral notches spaced apart corresponding to said jaws, and a plurality of springs respectively associated with said jaws, each of said springs comprising a U-shaped member having a first leg, the forward end of which is connected to a jaw, and a second leg having a turned-over end engaging in said groove, said second leg, adjacent said turned-over end, extending through a respective notch in said flange, said nut having openings respectively accommodating the rear closed ends of said springs.

8. In a chuck, a spindle having a thread, a nut screwed onto said thread, a shell carried by said nut, a plurality of jaws within said shell and adapted to be moved towards each other when said shell is moved rearwardly of said spindle, a thrust washer rotatably mounted on the forward end of said spindle and adapted to engage said jaws, a disk between said thrust washer and spindle and forming with said washer a circumferential groove, said disk having notches in its periphery, and a plurality of springs respectively associated with said jaws, each of said springs comprising a U-shaped member provided with a long leg and a short leg, said jaws being respectively connected to said long legs, each of said short legs having an inturned end engaging in said groove, said short legs respectively extending through said notches, said nut having openings respectively accommodating the rear ends of said springs.

9. In a chuck, a threaded spindle having an annular groove adjacent and spaced rearwardly from its forward end, a nut screwed onto said threaded spindle, a shell secured to said nut and having its forward end inwardly tapered, jaws within said tapered end of said shell, the forward end of said spindle being adapted to engage the rear ends of said jaws, and a plurality of U-shaped springs respectively associated with said jaws, said nut having a plurality of longitudinal openings in which the rear closed ends of said springs are respectively located, each of said springs having a head on the end of one of its legs and engaging in said groove.

HINMAN L. SMITH.
AUSTIN L. STOWELL.